(12) United States Patent
Studer

(10) Patent No.: US 11,292,580 B2
(45) Date of Patent: Apr. 5, 2022

(54) PROPULSION UNIT FOR AIRCRAFT

(71) Applicant: Safran Nacelles, Gonfreville L'Orcher (FR)

(72) Inventor: Vincent Joseph Rodolphe Studer, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 185 days.

(21) Appl. No.: 16/859,016

(22) Filed: Apr. 27, 2020

(65) Prior Publication Data

US 2020/0262539 A1 Aug. 20, 2020

Related U.S. Application Data

(63) Continuation of application No. PCT/FR2018/052660, filed on Oct. 26, 2018.

(30) Foreign Application Priority Data

Oct. 26, 2017 (FR) ...................................... 1760091

(51) Int. Cl.
*B64C 7/02* (2006.01)
*B64D 27/26* (2006.01)
*B64D 27/18* (2006.01)
*B64D 29/02* (2006.01)

(52) U.S. Cl.
CPC ................ *B64C 7/02* (2013.01); *B64D 27/26* (2013.01); *B64D 27/18* (2013.01); *B64D 29/02* (2013.01); *B64D 2027/262* (2013.01)

(58) Field of Classification Search
CPC ............ B64C 7/02; B64D 27/26; B64D 29/02
See application file for complete search history.

(56) References Cited

U.S. PATENT DOCUMENTS

| | | | |
|---|---|---|---|
| 2,910,209 A * | 10/1959 | Nelson | A61G 17/036 220/378 |
| 5,332,239 A | 7/1994 | Steinetz et al. | |
| 2011/0024994 A1* | 2/2011 | Bunel | F16J 15/027 277/637 |
| 2015/0098810 A1 | 4/2015 | Soria et al. | |

(Continued)

FOREIGN PATENT DOCUMENTS

| | | |
|---|---|---|
| EP | 0753654 | 1/1997 |
| EP | 2543864 | 1/2013 |

(Continued)

OTHER PUBLICATIONS

International Search Report for International Application PCT/FR2018/052660, dated Jan. 18, 2019.

*Primary Examiner* — Michael H Wang
(74) *Attorney, Agent, or Firm* — Burris Law, PLLC

(57) ABSTRACT

In a propulsion unit for an aircraft, including a nacelle and a turbojet engine supported by a pylon, a nacelle includes an outer shroud, a fixed internal structure defining, with the outer shroud, an annular space in which a cold air stream can circulate, and a sealing ring positioned between the fixed internal structure and the pylon. The sealing ring is used to separate a cold pylon zone from a hot engine zone. The propulsion unit includes a ventilation device allowing a portion of cold air of the cold air stream to be deviated to the sealing ring in order to ventilate the sealing ring.

9 Claims, 7 Drawing Sheets

(56) References Cited

U.S. PATENT DOCUMENTS

2018/0156051 A1* 6/2018 Strutt .................. B64D 29/06
2020/0109644 A1* 4/2020 Pretty .................. F16J 15/027

FOREIGN PATENT DOCUMENTS

| EP | 3153689 | 4/2017 |
| FR | 2914957 | 10/2008 |
| FR | 2920215 | 2/2009 |
| RU | 2008480 | 2/1994 |
| RU | 2053399 | 1/1996 |
| RU | 2448265 | 4/2012 |

* cited by examiner

PROPULSION UNIT FOR AIRCRAFT

CROSS-REFERENCE TO RELATED APPLICATIONS

This application is a continuation of International Application No. PCT/FR2018/052660, filed on Oct. 26, 2018, which claims priority to and the benefit of FR 17/60091 filed on Oct. 26, 2017. The disclosures of the above applications are incorporated herein by reference.

FIELD

The present disclosure relates to a propulsion unit for an aircraft having a turbojet engine nacelle, a pylon, and a fire-resistant sealing gasket.

BACKGROUND

The statements in this section merely provide background information related to the present disclosure and may not constitute prior art.

A propulsion unit for an aircraft, such as of the cold stream thrust reverser type, may comprise a nacelle surrounding a turbojet engine.

The upstream portion of the nacelle is intended to channel air towards the inlet of the turbojet engine, and the downstream portion of the nacelle allows discharging the air that has passed through the turbojet engine at high speed, thereby allowing generating the thrust necessary to the propulsion of the aircraft.

A nacelle typically comprises an outer fairing defining the outer aerodynamic profile of the nacelle, and an inner fairing surrounding the turbojet engine, the space between these two fairings defining a cold flow path of the nacelle.

The inner fairing, often referred to as "inner fixed structure" of the nacelle, or "IFS", is extended in its downstream portion by a combustion gas ejection primary nozzle, allowing channeling the exit of hot air coming from the core of the turbojet engine.

In a typical architecture of a cold stream thrust reverser, the engine area located between the inner panel IFS of the thrust reverser and the engine, called core compartment area, also called "core" compartment is a fire classified area. In addition, in normal operation, this area is subjected to a severe thermal environment, in particular in its downstream portion.

In order to safeguard the wing and systems such as the pylon linking the propulsion unit to the wing, and which are located above the turbojet engine and the nacelle thereof in the case of an installation below the wing, it is necessary to ensure sealing between the "core" area and the area of the pylon in order to avoid any penetration of flame in the event of fire.

To this end, it is known in the state of the art to dispose a sealing gasket made of an elastomer, commonly called fire-resistant seal or fire seal or pylon seal, carried by the inner fixed structure and bearing on the pylon (or aircraft mast).

These seals, as described for example in the application FR2920215 are typically constituted by several plies, made of the same material or of several materials depending on the desired strength and of an elastomer. The formulation of the elastomer depends on the experience of the supplier and on the use situation.

These gaskets typically have a bulb shape and have extensions, or feet, to ensure the supporting thereof on the structure.

Hence, the pylon gasket separates a cold pylon area from the hot "core" area of the turbojet engine.

As example, these gaskets are subjected to temperatures up to a maximum of 205° C. in a long run exposure, and even up to a maximum of 225° C. and 250° C. in a short run exposure.

However, these high temperatures may result in remanence and mechanical strength issues of the gasket after a prolonged exposure to high temperatures, and in particular in the downstream area of the nacelle. The gasket may even be considerably damaged and therefore cannot withstand temperatures higher than 250° C. for a long period.

SUMMARY

This section provides a general summary of the disclosure and is not a comprehensive disclosure of its full scope or all of its features.

The present disclosure provides a propulsion unit for an aircraft comprising a sealing gasket downstream of the nacelle that withstands high temperatures for a longer period.

The present disclosure concerns a propulsion unit for an aircraft comprising a nacelle comprising a turbojet engine supported by a pylon. The nacelle comprising: an outer fairing, an inner fixed structure delimiting, together with the outer fairing, an annular space in which a cold air flow path can circulate, and a sealing gasket positioned between the inner fixed structure and the pylon, the sealing gasket being intended to separate a cold pylon area from a hot engine area.

According to the present disclosure, the propulsion unit comprises a ventilation device allowing diverting a portion of the cold air from the cold air flow path up to the sealing gasket to ventilate it.

According to a form of the present disclosure, the sealing gasket comprises a hollow portion ventilated by the ventilation device.

According to yet another form of the present disclosure, the ventilation device ventilates the hollow portion of the sealing gasket by a cold air flow adapted to pressurize the inside of the sealing gasket.

According to another form of the present disclosure, the ventilation device ventilates the outer surface of the sealing gasket.

Advantageously, the ventilation device comprises a ventilation channel transversely crossing the inner fixed structure. The ventilation channel comprises a cold air inlet opening into the cold air flow path and a cold air outlet opening into a ventilation space formed between the inner fixed structure and the pylon, in the vicinity of the sealing gasket.

According to at least one form of the present disclosure, the propulsion unit comprises a gasket support positioned within the ventilation space. The gasket support comprises a lower portion fastened to the inner fixed structure, an upper portion supporting the sealing gasket and a cavity into which opens the cold air outlet of the ventilation channel. The ventilation device comprises at least one ventilation orifice crossing the upper portion of the gasket support. The cold air portion circulates from the ventilation channel towards the cavity before coming out through the ventilation orifice.

According to a form of the present disclosure, the ventilation orifice crosses one of the transverse walls of the gasket support so as to ventilate the outer surface of the sealing gasket and open into the hot engine area.

According to another form of the present disclosure, the ventilation orifice crosses an upper wall of the gasket support. The sealing gasket comprises an orifice facing the ventilation orifice so as to form a fluidic communication between the cavity and the hollow portion of the sealing gasket to ventilate the inside of the latter.

According to another form of the present disclosure, the ventilation device comprises a duct inside the cavity of the gasket support connecting the ventilation channel to the ventilation orifice.

According to variations of the present disclosure, the duct is formed by a channel running along one of the transverse walls of the gasket support and by a support cavity formed under the upper wall of the gasket support. The support cavity is delimited by the upper wall of the gasket support and by an additional wall.

The upper wall of the gasket support supports a C-shaped holding element into which are inserted two extensions of the sealing gasket or feet extending radially from the hollow portion.

Alternatively, the support cavity corresponds to the space formed between the holding element and the upper wall of the gasket support. The channel is connected to the support cavity opening inside the sealing gasket by at least one ventilation orifice.

Thus, the present disclosure provides a propulsion unit for an aircraft comprising a sealing gasket which withstands high temperature for a longer period.

The ventilation device of the present disclosure enables the sealing gasket to withstand temperatures higher than 250° C. The mechanical performances of the gasket are not altered at these temperatures.

The present disclosure provides a simple and low-cost solution.

It allows using the known and mature fire gaskets technologies, without resulting in over-costs in homologating new types of very high temperature gaskets.

The ventilation is beneficial to the strength of the gasket in nominal operation but also in the event of fire.

The ventilation also participates in the ventilation of the turbojet engine in the core compartment area (hot engine area).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
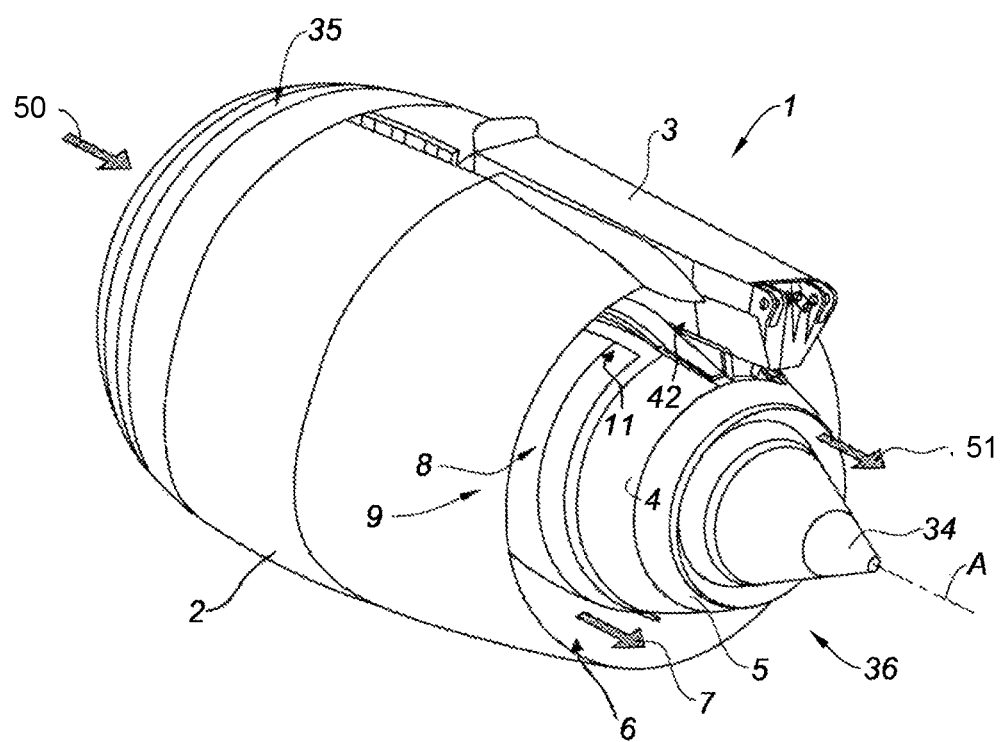
FIG. 1 is a perspective view of a propulsion unit for an aircraft comprising a turbojet engine nacelle supported by a pylon.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents a perspective view of a propulsion unit 1 for an aircraft comprising a turbojet engine 8 and a nacelle 2 supported by a pylon 3 or aircraft mast.

The propulsion unit 1 composed by the pylon 3, the nacelle 2 and the turbojet engine 8 is presented with an upstream (or front) side to the left of the drawing and a downstream (or rear) side to the right of the drawing.

The air represented by the arrow 50 is sucked into the air inlet 35 by the fan (not shown).

The propulsion unit 1 comprises an outer fairing 9 which includes a cowl and an inner fixed structure 4 delimiting, together with the outer fairing 9, an annular space 6. The inner fixed structure 4 is in the form of a panel.

A portion of the air propelled by the fan (not shown) is emitted into the annular space 6 in which circulates a cold air flow path 7 (or cold flow path).

The fan (not shown) is driven by the core of the turbojet engine 8 which comprises a compressor, a combustion chamber and a turbine (not shown).

The combustion gases obtained by the combustion of fuel and air collected at the outlet of the fan are ejected after having passed through the turbine through a hot flow path represented by the arrow 51 between a gas ejection primary nozzle 5 and a gas ejection cone 34.

The unit is constructed and installed according to a longitudinal axis A. The pylon 3 enables the suspension of the nacelle 2 and the turbojet engine 8 to the wing of an aircraft (not shown).

The gas ejection primary nozzle 5 for ejecting the combustion gases emitted by the body of the turbojet engine 8 is positioned at the downstream (or rear) portion 36 of the nacelle 2. The body of the turbojet engine 8 is mounted inside the inner fixed structure 4 of the nacelle 2.

A sealing gasket 10 is provided between the inner fixed structure 4 and the pylon 3 to separate a cold pylon area 11 from a hot engine area 12. The sealing gasket 10 is compressed against the pylon 3 and more specifically against a lateral face 42 of the pylon 3 which serves as a bearing area (or "landing" of the gasket).

The cold pylon area 11 is positioned on the side of the pylon 3, in contrast with the hot engine area 12 located in the core compartment of the engine also called "core" compartment where the temperature is high.

The sealing gasket 10, commonly called fire-resistant sealing gasket 10 or pylon gasket, as it is compressed on the pylon 3, is in charge of protecting the pylon 3.

The sealing gasket 10 is positioned over the length of the pylon 3 and is particularly biased at the rear portion of the pylon 3.

By symmetry, the propulsion unit 1 comprises two inner fixed structures 4 disposed on each side of the pylon 3.

Hence, the propulsion unit 1 comprises at least two sealing gaskets 10 positioned on either side of the pylon 3.

The sealing gasket 10 comprises a hollow portion 19 and two feet 33 extending radially from the hollow portion 19. In this example, the hollow portion 19 has a cylindrical shape but may have a different shape.

According to the present disclosure, the propulsion unit 1 comprises a ventilation device 13 allowing diverting a cold air portion 14 from the cold air flow path 7 up to the sealing gasket 10 to ventilate it and cool it down.

This solution allows ventilating the sealing gasket 10 or a portion of the sealing gasket 10 subjected to very high temperatures in normal operation.

The ventilation device 13 is positioned on both sides of the pylon 3 to cool down two sealing gaskets 10 running along the two respective lateral faces 42 of the pylon 3.

The ventilation device 13 is positioned in priority downstream of the nacelle. It may be positioned over the entire length of the pylon 3. The ventilation device 13 may also be disposed along other sealing gaskets such as those positioned upstream of the inner fixed structure 4.

The ventilation device 13 comprises at least one ventilation channel 15 transversely crossing the inner fixed structure 4, as illustrated in FIGS. 2 and 4 to 7.

The ventilation channel 15 comprises a cold air inlet 16 opening into the cold air flow path 7 and a cold air outlet 17 opening into a ventilation space 18 formed between the inner fixed structure 4 and the pylon 3, in the vicinity of the sealing gasket 10. This ventilation space 18 is located at the top portion of the "core" compartment of the engine.

The propulsion unit 1 comprises a gasket support 20 positioned within the ventilation space 18.

In this example, the gasket support 20 has a U-like general shape but may have other equivalent shapes.

The gasket support 20 comprises a lower portion 21 fastened to the inner fixed structure 4, an upper portion 22 supporting the sealing gasket 10 and a cavity 25 into which opens the cold air outlet 17 of the ventilation channel 15.

Figure 2:
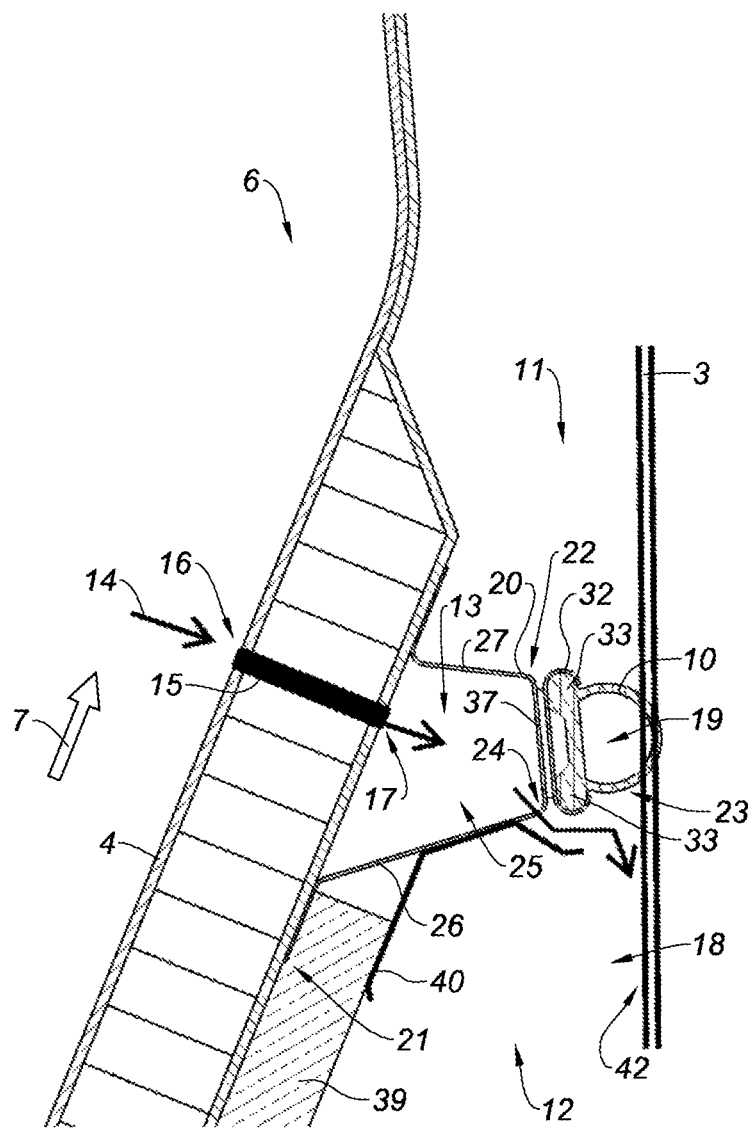
FIG. 2 is a schematic view of a ventilation device according to a first form of the present disclosure.

The cavity 25 extends along the inner fixed structure 4, in a direction perpendicular to the plane of FIG. 2.

The gasket support 20 extends according to a direction X, perpendicular to the plane of FIG. 2.

The ventilation device 13 comprises at least one ventilation orifice 24 positioned at the upper portion 22 of the gasket support 20.

Thus, the cold air portion 14 collected in the cold air flow path 7 can circulate from the ventilation channel 15 towards the cavity 25 before coming out through the ventilation orifice 24 and ventilating the sealing gasket 10.

The cavity 25 of the gasket support 20 is delimited by a first transverse wall 26 positioned on the side of the hot engine area 12, by a second transverse wall 27 positioned on the side of the cold pylon area 11 and by an upper wall 37.

A thermal mat 39 is held along the inner fixed structure 4, on the side of the hot engine area 12, by a holding element 40 fastened to the gasket support 20.

Figure 3:
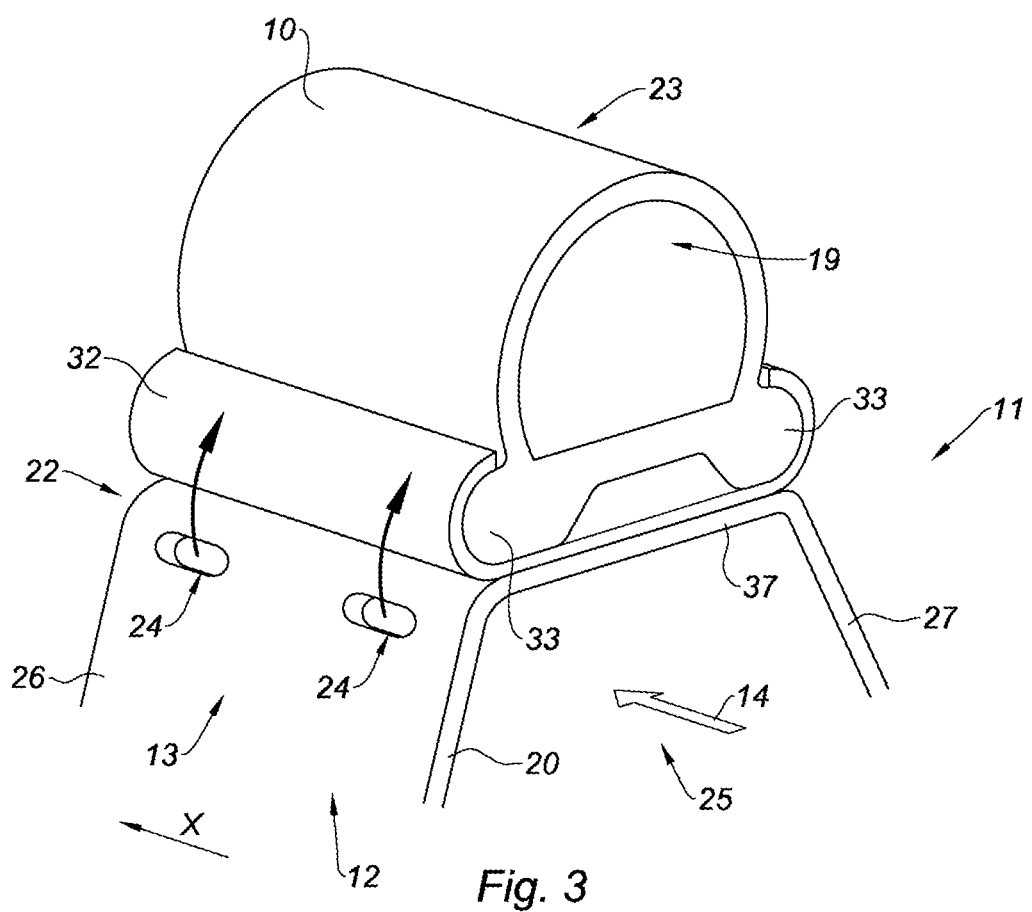
FIG. 3 is a perspective view showing the detail of the ventilation orifices in the gasket support of FIG. 2.

According to a first form of the present disclosure represented in FIGS. 2 and 3, the ventilation orifice(s) 24 cross(es) the first transverse wall 26 of the gasket support 20 so as to ventilate the outer surface 23 of the sealing gasket 10 and open into the hot engine area 12.

Figure 7:
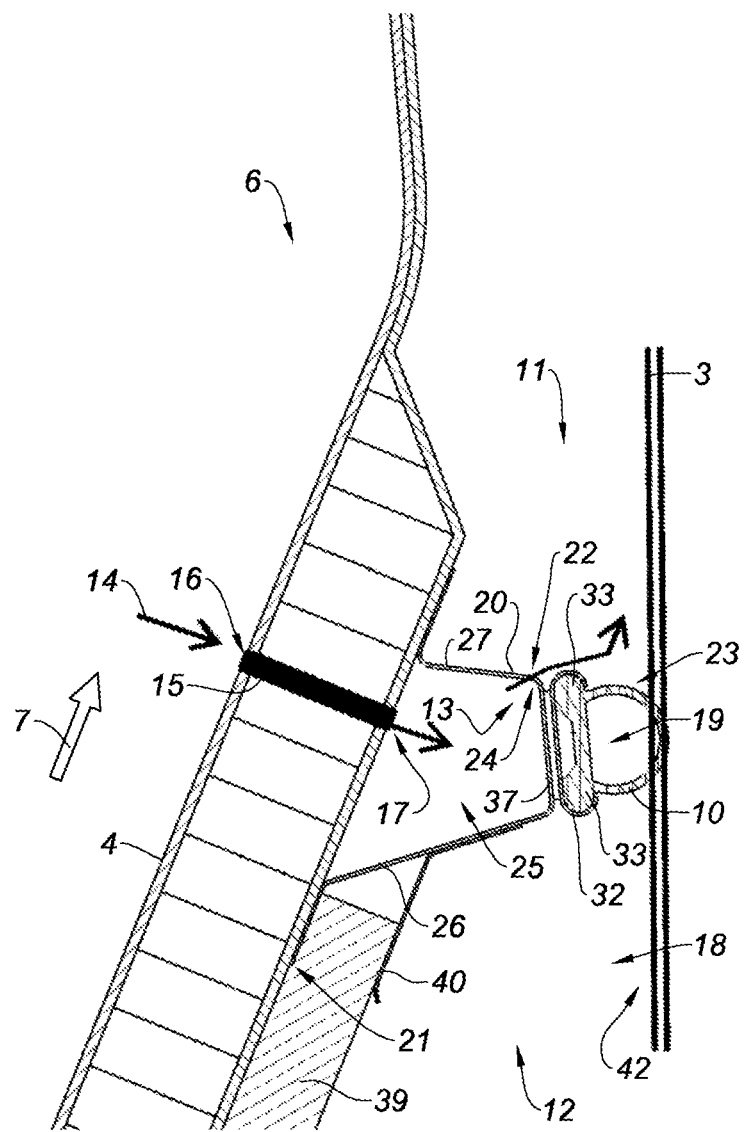
FIG. 7 is a schematic view of a ventilation device according to a fifth form of the present disclosure.

Another form of the present disclosure is illustrated in FIG. 7. It is possible to place the outlet points (ventilation orifices 24) on the side of the pylon 3. The ventilation orifices 24 open into the cold pylon area 11.

The ventilation orifice(s) 24 then cross(es) the second transverse wall 27 of the gasket support 20 so as to ventilate the outer surface 23 of the sealing gasket 10 and open into the cold pylon area 11.

Irrespective of these forms of the present disclosure, the ventilation orifices 24 have an oblong shape extending according to a direction X in this example, but may have a different shape.

The ventilation orifices 24 are also evenly distributed side by side along the first transverse wall 26 or of the second transverse wall 27 of the gasket support 20 according to this direction X and in the proximity of the upper wall 37 of the gasket support 20.

The sealing gasket 10 is disposed on the upper wall 37 of the gasket support 20.

The bottom of the upper wall 37 of the gasket support 20, inside the cavity 25, and even the gasket support 20, are also ventilated, thereby cooling down the sealing gasket 10 by thermal conduction.

The gasket support 20 is fastened to the inner fixed structure 4 in a substantially tight manner.

Advantageously, this cavity 25 is sealed by keeping only calibrated outlet points (ventilation orifices 24). These calibrated outlet points may be assimilated to a piccolo and are distributed along the portion to be protected.

The air flow can come out only through the ventilation orifices 24.

Thus, it is possible to maintain an overpressure in this cavity 25 by the cold air flow path 7.

Alternatively, the ventilation air can be discharged into the cold pylon area 11 through the ventilation orifices 24 positioned on the second transverse wall 27 of the gasket support 20.

Figure 4:
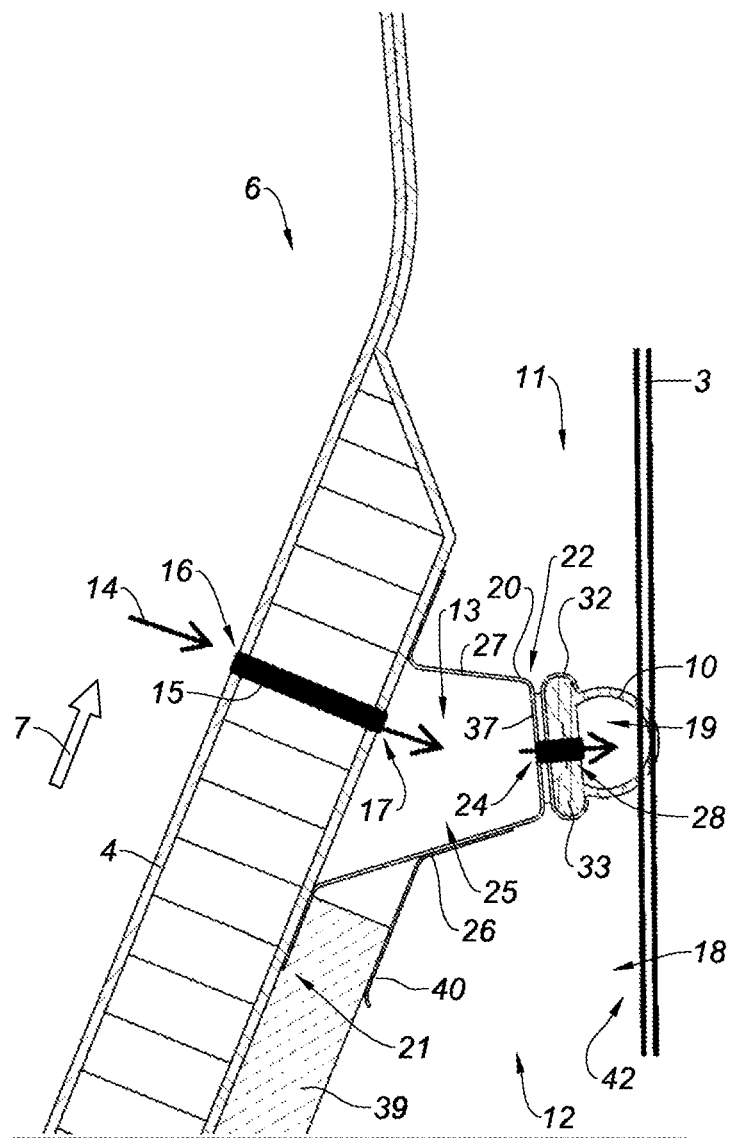
FIG. 4 is a schematic view of a ventilation device according to a second form of the present disclosure.

According to another form of the present disclosure illustrated in FIG. 4, the ventilation orifice 24 crosses the upper wall 37 of the gasket support 20.

The sealing gasket 10 comprises an orifice 28 facing the ventilation orifice 24 so as to form a fluidic communication between the cavity 25 and the hollow portion 19 of the sealing gasket 10 to ventilate the inside of the latter.

In other forms of the present disclosure, the hollow portion 19 of the sealing gasket 10 is ventilated by a cold air flow sufficient to pressurize the inside of the sealing gasket 10.

The ventilation device 13 may also comprise at least one duct 29 inside the cavity 25 of the gasket support 20 connecting the ventilation channel 15 to the ventilation orifice 24.

Figure 5:
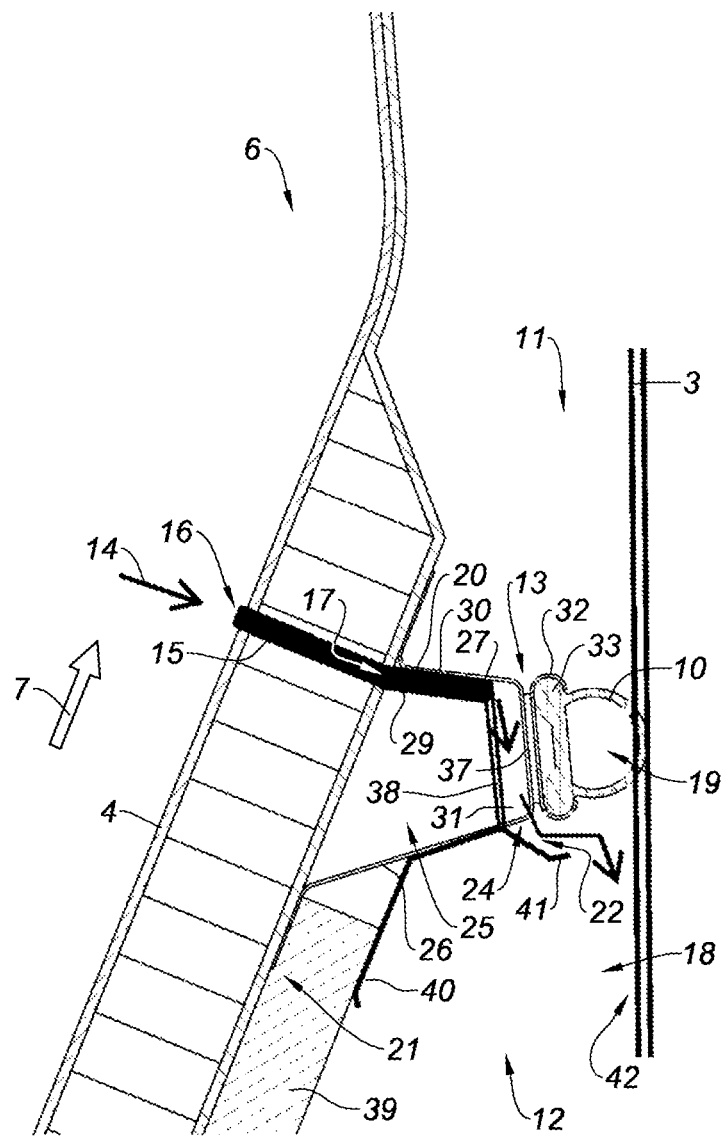
FIG. 5 is a schematic view of a ventilation device according to a third form of the present disclosure.

According to another form of the present disclosure illustrated in FIG. 5, the duct 29 is formed by a channel 30 running along one of the transverse walls 26, 27 of the gasket support 20 and of a support cavity 31 formed under the upper wall 37 of the gasket support 20.

The support cavity 31 is delimited by an additional wall 38 and by the upper wall 37 of the gasket support 20.

The support cavity 31 extends along the gasket support 20 according to the direction X.

In this example, the ventilation orifices 24 cross the first transverse wall 26 of the gasket support 20 so as to ventilate the outer surface 23 of the sealing gasket 10 and open into the hot engine area 12.

The ventilation channel 15 is connected to the channel 30 of the gasket support 20 which is connected to the support cavity 31. This allows obtaining a cavity with reduced dimensions, thereby increasing the pressure of the cold air portion 14 and the effectiveness of the ventilation.

The holding element 40 allows channeling the air flow towards the outer surface 23 of the sealing gasket 10 at the outlet of the ventilation orifices 24.

More specifically, the holding element 40 comprise an outer protrusion 41 positioned facing the ventilation orifice 24.

The direction of the air jets at the outlet is selected so as to create a film between the hot engine area 12 and the bulb of the sealing gasket 10.

The upper wall 37 of the gasket support 20 comprises a C-shaped holding element 32 into which the two feet 33 of the sealing gasket 10 are inserted.

The C-like shape of the holding element 32 allows obtaining a Coanda effect with the roundness of the C and directing the air flow towards the sealing gasket 10.

Figure 6:
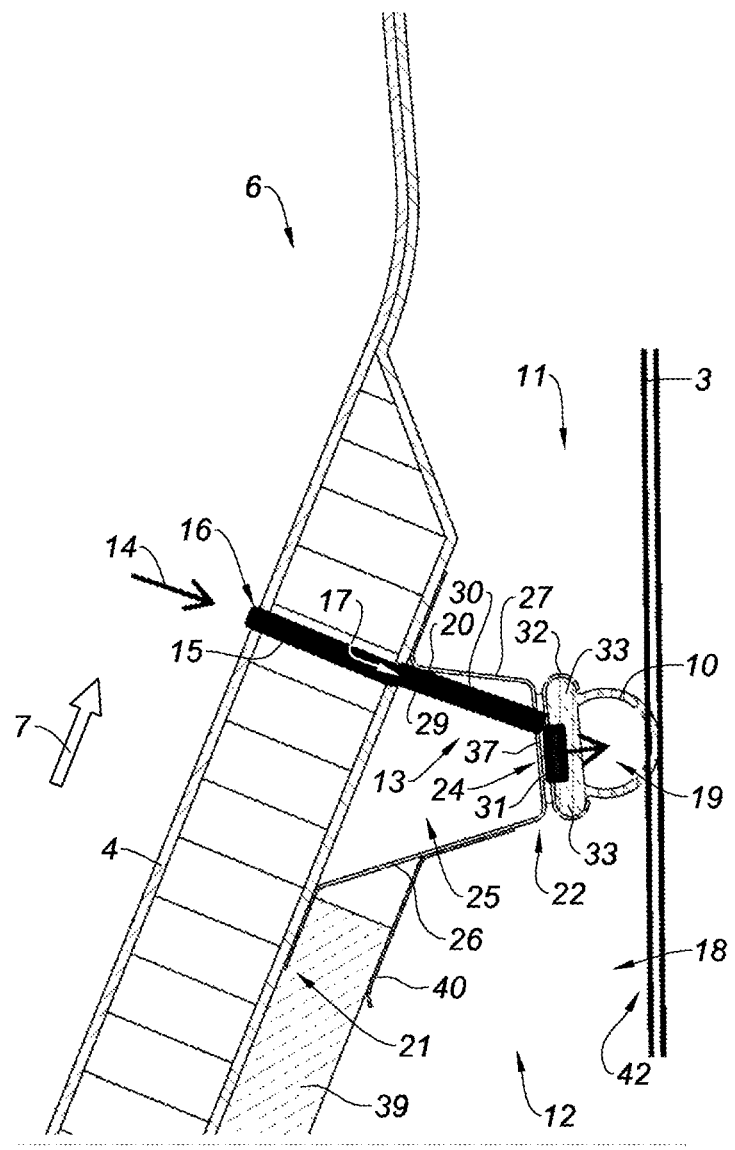
FIG. 6 is a schematic view of a ventilation device according to a fourth form of the present disclosure.

According to another form of the present disclosure illustrated in FIG. 6, the support cavity 31 corresponds to the space formed between the C-shaped holding element 32 and the upper wall 37 of the gasket support 20. This allows obtaining a cavity with reduced dimensions, thereby increasing the pressure of the cold air portion 14 and the effectiveness of the ventilation.

The channel 30 is connected to the support cavity 31 opening inside the sealing gasket 10 through at least one ventilation orifice 24.

The ventilation channel 15 is connected to the channel 30 of the gasket support 20 which is connected to the support cavity 31 opening inside the sealing gasket 10.

Alternatively, and depending on the architecture of the propulsion unit, it is possible to share this ventilation with a ventilation for other parts, typically the ventilation of the "bumper" metal fittings on the IFS.

In the case where the ventilation air is discharged in the hot engine area 12 (core compartment), this air flow participates in the overall ventilation of the engine.

According to another variant (not shown), the lateral face 42 of the pylon 3 locally comprises a heat shield to reduce the supply of heat by conduction towards the gasket bearing area.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A propulsion unit for an aircraft comprising a nacelle and a turbojet engine supported by a pylon, the nacelle comprising:
    an outer fairing;
    an inner fixed structure delimiting, together with the outer fairing, an annular space in which a cold air flow path can circulate; and
    a sealing gasket positioned between the inner fixed structure and the pylon, the sealing gasket separating a cold pylon area from a hot engine area,
    wherein the propulsion unit comprises:
    a ventilation device allowing a cold air portion to be diverted from the cold air flow path up to the sealing gasket to ventilate the sealing gasket, the ventilation device comprising a ventilation channel transversely crossing the inner fixed structure, the ventilation channel comprising a cold air inlet opening into the cold air flow path and a cold air outlet opening into a ventilation space formed between the inner fixed structure and the pylon, proximate the sealing gasket; and
    a gasket support positioned within the ventilation space, the gasket support comprising a lower portion fastened to the inner fixed structure, an upper portion supporting the sealing gasket and a cavity into which the cold air outlet of the ventilation channel opens, the ventilation device comprising at least one ventilation orifice crossing the upper portion of the gasket support, the cold air portion circulating from the ventilation channel towards the cavity before coming out through the at least one ventilation orifice.

2. The propulsion unit according to claim 1, wherein the ventilation device comprises a duct inside the cavity of the gasket support connecting the ventilation channel to the at least one ventilation orifice.

3. The propulsion unit according to claim 1, wherein the sealing gasket comprises a hollow portion ventilated by the ventilation device.

4. The propulsion unit according to claim 3, wherein the ventilation device ventilates the hollow portion of the sealing gasket by a cold air flow adapted to pressurize inside of the sealing gasket.

5. The propulsion unit according to claim 3, wherein the at least one ventilation orifice crosses an upper wall of the gasket support, the sealing gasket comprising an orifice facing the at least one ventilation orifice so as to form a fluidic communication between the cavity and the hollow portion of the sealing gasket to ventilate inside of the sealing gasket.

6. The propulsion unit according to claim 5, wherein a duct is formed by a channel running along a transverse wall of the gasket support and by a support cavity formed under the upper wall of the gasket support, the support cavity being delimited by the upper wall of the gasket support and by an additional wall.

7. The propulsion unit according to claim 5, wherein the upper wall of the gasket support supports a C-shaped holding element into which are inserted two feet of the sealing gasket extending radially from the hollow portion, a support cavity corresponding to a space formed between the C-shaped holding element and the upper wall of the gasket support, the channel running along a transverse wall of the gasket support being connected to the support cavity opening inside the sealing gasket by the at least one ventilation orifice.

8. The propulsion unit according to claim 1, wherein the ventilation device ventilates an outer surface of the sealing gasket.

9. The propulsion unit according to claim 8, wherein the ventilation orifice crosses one of the transverse walls of the gasket support so as to ventilate the outer surface of the sealing gasket.

* * * * *